United States Patent [19]

Hochmuth

[11] Patent Number: 5,822,591
[45] Date of Patent: Oct. 13, 1998

[54] VIRTUAL CODE SYSTEM

[75] Inventor: Roland Hochmuth, Fort Colligs, Colo.

[73] Assignee: Hewlett-Packard Company, Palo Alto, Calif.

[21] Appl. No.: 705,572

[22] Filed: Aug. 29, 1996

[51] Int. Cl.⁶ ............................................. G06F 9/45
[52] U.S. Cl. ................. 395/705; 395/702; 395/710; 395/685
[58] Field of Search .................. 395/705, 702, 395/710, 707–708, 500, 587, 586, 581, 685

[56] References Cited

U.S. PATENT DOCUMENTS

| | | | |
|---|---|---|---|
| 5,408,665 | 4/1995 | Fitzgerald | 395/710 |
| 5,553,286 | 9/1996 | Lee | 395/705 |
| 5,619,698 | 4/1997 | Lillich et al. | 395/710 |
| 5,659,751 | 8/1997 | Heninger | 395/685 |

*Primary Examiner*—James P. Trammell
*Assistant Examiner*—Tuan Q. Dam

*Attorney, Agent, or Firm*—Augustus W. Winfield

[57] ABSTRACT

A process for creating new software procedures during run time. An applications program calls a procedure that indirectly corresponds to a set of variables. A library determines that the procedure is not already defined in the library. In a first embodiment, the library builds a source code file to be compiled. In a second embodiment, the library object code creates a string of directives that form part of a command line calling a compiler. The compiler compiles a source code file, selectively compiling only portions of the source code file designated by the command line directives that were created by the library code. For either embodiment, the resulting newly compiled procedure is provided to the applications program by the library in a manner that is transparent to the applications program. No changes are required to the applications program or to the compiler. The library code may add the procedure to the library if there is space, or replace the least recently used or least frequently used procedure if the library is at a capacity limit. As a result, the library can adapt to the set of features being used by the applications program, or the sets of features being used by multiple application programs if the library is shared, or adapt to changes in procedures being used over time.

7 Claims, 6 Drawing Sheets

VIRTUAL CODE SYSTEM

FIELD OF INVENTION

This invention relates generally to computer software and more specifically to dynamic creation and compilation of specialized procedures, as needed, during execution of object-code.

BACKGROUND OF THE INVENTION

FIG. 1 illustrates a common software situation. In FIG. 1, if a variable named "A" is enabled (decision 100), then a set of code associated with variable "A" is executed (box 102). After testing for variable "A" and possibly executing associated code for variable "A", the software tests for a second variable "B" (decision 104) and depending on the result of the second test, the software may execute a set of code associated with variable "B" (box 106). If a program has a long sequence of tests or decisions as in FIG. 1, performance may be substantially reduced. First, no useful work is being done during processing of the decisions. In addition, as discussed immediately below, a long sequence of tests or decisions may disrupt performance enhancements such as pipelining, parallel processing, memory caching, and compiler enhancements.

Computer processors typically overlap parts of the execution of multiple instructions in a process called pipelining. Execution is broken into different sequential steps. For example, execution of an instruction may first require the step of fetching the instruction from memory, followed by the step of decoding the instruction, followed by the step of fetching operands needed by the instruction from memory, followed by execution of the instruction and finally the step of storing the results in memory. While one instruction is being fetched from memory, another instruction is being decoded, operands are being fetched for another instruction, and so forth. If the instruction being executed is a conditional branch instruction, the partially executed instructions in the pipeline may or may not be needed depending on the outcome of the conditional branch. Computer processors, in conjunction with compilers and operating systems, typically attempt to accommodate conditional branches by overlapping or interleaving instructions from each of the possible paths (concurrent processing), or by dynamic branch prediction (for example by saving information from past execution that indicates which path is usually taken), or by simply arbitrarily assuming one path and preprocessing instructions in that path.

Referring back to FIG. 1, at the time the processor is executing the decision 100, it may have prefetched and partially executed instructions from box 102 and decision 104. Alternatively, the processor and/or operating system may have stored a small amount of branching history, so that if decision 100 has been executed recently or often, the processor may anticipate that the decision will branch as before and may prefetch and partially execute instructions only for that one path. The ability of any processor to anticipate future branch paths is limited. Given a sufficiently large number of consecutive conditional branches as depicted in FIG. 1, the processor typically will eventually be forced to flush all the partially executed code in the pipeline and start refilling the pipeline with code from a branch path that has no partial execution in the pipeline.

Computer memory systems are typically arranged in a hierarchy, with frequently or recently accessed items placed in relatively fast local memory (called a cache) and other items placed in relatively slow or remote memory. If code for a particular branch path is infrequently executed, code for the particular branch path may be in a lower part of the memory hierarchy. If a branch instruction results in requiring the particular branch path, an instruction cache may have to be flushed and refilled with code for the particular branch path. If pipeline flushing or cache flushing happens frequently, performance may be substantially reduced.

One approach to reducing pipeline flushing and cache flushing due to conditional branches is to provide special streamlined procedures that eliminate the conditional branch instructions. For example, in FIG. 1, if variables "A" and "B" are commonly enabled together, boxes 102 and 106 in FIG. 1 may be combined into one streamlined block of code without decisions 100 and 104. A library of procedures may be provided that includes procedures for streamlined execution of common combinations of variables.

Consider, for example, software for determining the color parameters of a single pixel in a graphics display. In a two dimensional computer aided design (CAD) system for circuit design (line drawing of schematics), the software must determine whether the coordinates of the pixel fall on the incremental extensions of a few lines and then either turn the pixel on or off. In contrast, each pixel in a CAD system for rendering an industrial design model of an automobile may require polygonal primitives, coordinate transformations, color model transformations, hidden surface removal, analysis of light sources, shadows, shading, specular and diffuse reflections, fog, texture, translucency and transparency, and perhaps many other variables. Clearly, if a CAD system is used primarily for circuit design, but the graphics procedures include all the conditional branches required for general rendering, then performance for simple circuit design will be degraded. However, in many cases, a single compiled CAD program may be used for a diverse set of applications, such as simple line drawing and industrial design rendering. Alternatively, two separate applications, with very different needs, may share a common graphics library. Therefore, there is a need for software, particularly graphics library software, that can provide high performance for commonly used combinations of variables while still providing a capability for the most general case.

FIG. 2 illustrates a graphics software program 200 for drawing triangles, where each triangle may have any combination of four variables, for example, color, texture, translucency, and diffuse reflections (depicted in FIG. 2 as A, B, C and D). Software to the right of the dashed line 202 is invoked by a graphics run-time (object-code) library 204. The library 204 includes some procedures that have been compiled as streamlined code. Program 200 first specifies a triangle with variables (A,B) (box 206). Note that in FIG. 2, variables (A,B) are passed from the application to the library. In general, the variables may be modes or states that are defined (or enabled), independent of a draw command, as local variables within the library, or the variables may be passed as depicted in FIG. 2, or there may be a combination of defined and passed variables. The graphics library 204 includes a predefined procedure for drawing a triangle with variables (A,B) so "A" code and "B" code are executed sequentially without requiring decisions to determine if variables "A" and "B" are enabled (box 208). Next, program 200 specifies a triangle with variables (C,D) (box 210) and the library 204 invokes a corresponding streamlined procedure (box 212). Program 200 then specifies a triangle with variables (B,D) (box 214). The library 204 does not have a predefined procedure for this combination of variables and must therefore invoke a general object-code procedure that can accommodate any combination of variables. The object-code for the generalized procedure (box 216) is as depicted in FIG. 1, with a series of decisions and branches. An application requiring a substantial number of triangles with variables (B,D) will have lower performance than an application requiring only triangles with variables (A,B).

In many computer graphics applications, system features may include hundreds of primitives (lines, polygons, circles, etc.), data-types, graphics states, and other attributes such as color, lighting models, transparency, texture, etc. Hundreds of decisions may need to be made for each pixel, with thousands of pixels per line and thousands of lines per frame. An animation project may require tens of thousands of frames, potentially requiring on the order of $10^{12}$ conditional branches. Clearly, in computer graphics, special procedures as depicted in FIG. 2 are desirable. However, if there are 100 features, there are $2^{100}$ possible combinations of those features. It is impractical to provide a library having specialized procedures for all possible combinations of features. Therefore, systems are typically implemented as illustrated in FIG. 2, with specialized procedures for the most common combinations, plus a relatively low-performance general procedure that can accommodate all possible features.

There is a need for a capability of providing specialized procedures without requiring all possible procedures to be predefined and precompiled.

SUMMARY OF THE INVENTION

A finite number of specialized streamlined procedures, each corresponding to a particular set of variables, are provided by a library. If an applications software program requires a procedure for a particular set of variables, and the library does not contain a specialized procedure corresponding to the particular set of variables, the library code invokes a compiler to compile a specialized procedure corresponding to the particular set of variables. In one embodiment, the library code creates a source code file to be compiled. In an alternative embodiment, the library includes a general source code file, and the compiler selectively compiles the appropriate parts of the general source code file.

Procedures in the library are rank ordered, for example by frequency of usage or temporal (recent usage). If there is room in the library to add a new procedure, the newly compiled procedure is added to the library. If the library is full, or has reached some limit (predefined in the library code or user defined), the lowest ranked procedure in the library (least frequently used or least recently used) is deleted and replaced by the newly compiled procedure. Because of the conceptual similarity to virtual memory systems, the library is called a virtual code system.

The virtual code system is transparent to compilers and applications software. Only the library code is affected. Specialized and optimized procedures are adaptively built and replaced while the applications software is executing. For software applications having a large number of variables that need specialized procedures for combinations of variables, the virtual code system provides an immense number of specialized procedures, enabling the software applications to provide high performance for a broad range of specialized uses. For example, a single CAD application may be used for simple line drawing or for complex industrial design rendering, or separate CAD systems may share a common graphics library, with the library providing appropriate specialized procedures for either extreme. Alternatively, specialized procedures may be provided as needed for a window of time.

DETAILED DESCRIPTION OF THE PREFERRED EMBODIMENT OF THE INVENTION

In the present application, the "C" programming language is used to illustrate the invention. However, the invention may be implemented using other languages. In addition, computer graphics software is used to illustrate the invention. The invention is particularly applicable to computer graphics, specialized CAD languages, image processing, computer vision, kinematic synthesis, animation, libraries, toolkits and middleware. Individual graphics applications tend to use a small fixed subset of the available features, or features tend to remain constant over relatively long periods of time. For example, lighting tends to remain enabled for an entire view, and from frame to frame over many frames. However, the invention is generally applicable to any software requiring many combinations of features, including for example, text formatting languages, data-base programming, and publishing.

In the present application, the term "variables" is intended to include features, attributes, properties, traits, states, modes or other terms used to refer to a set of things that must be checked in a series of conditional branches. In particular, in graphics applications, variables include graphics primitive types (line, triangle, polygon, circle, etc.), data types, and graphics attributes (lighting, transparency, fog, etc.). The term "variables" is intended to include the mode or data type of numerical data, for example 2-D or 3-D, but is not intended to include the actual numerical data, for example coordinates, which may be "variable" but do not require a series of conditional branches.

In many computer systems, a processor produces virtual addresses that are translated by a combination of hardware and software to physical addresses, which access main memory. A processor request for a particular address may be mapped to a cache, to main memory, or may require data to be retrieved from a disk. Effectively, the processor retrieves data from a finite main memory, and if the requested item is not present in the main memory, the processor pauses (or execution of a particular thread of code pauses) while other hardware or the operating system replaces part of the main memory with the requested item. This is called a virtual memory system. Similarly, in accordance with the invention, software requests procedures from a finite library. If the requested procedure is not in the library, the processor pauses (or execution of a particular thread of code pauses) while part of the library is replaced with the requested procedure. In the present application, the name "virtual code" has been chosen because of the analog to virtual memory. However, in virtual memory, code or data is retrieved from another part of the memory hierarchy, whereas in the virtual code, the replacement procedure is compiled as needed. In effect, the virtual code system dynamically optimizes itself for a specific software application while the application is running.

Figure 1:
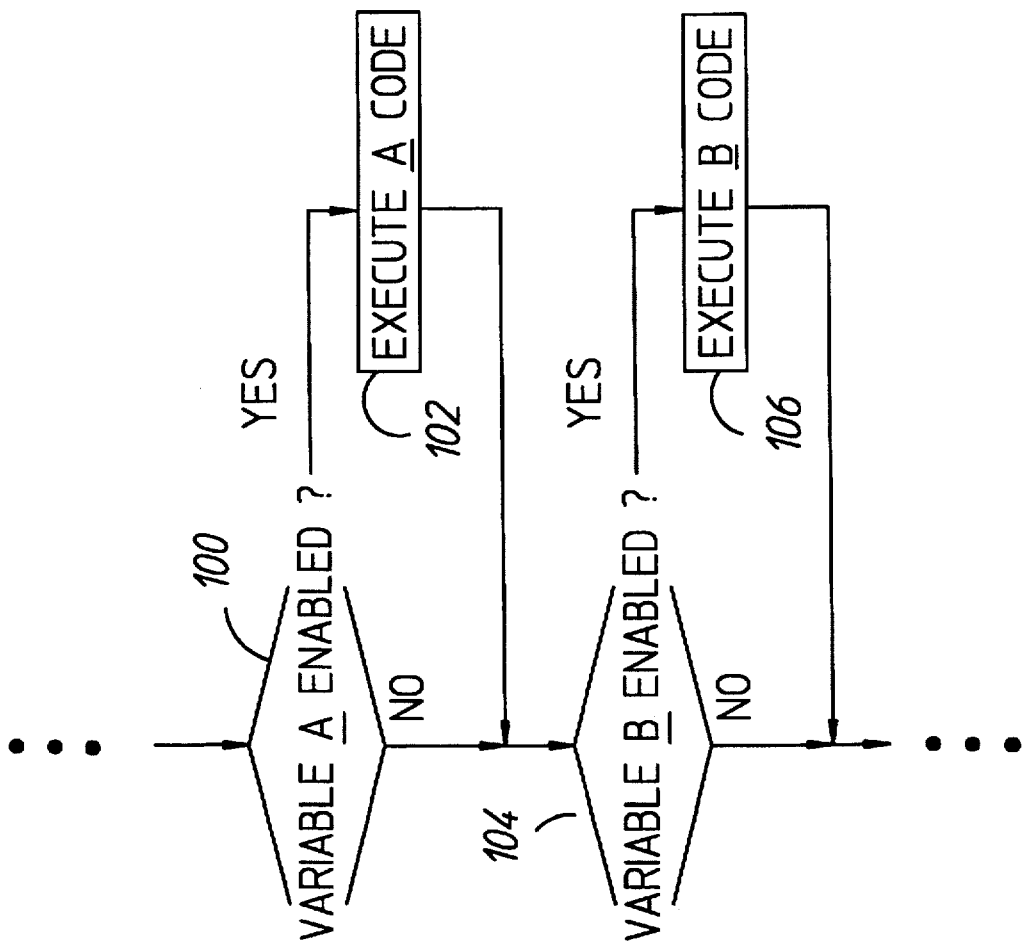
FIG. 1 (prior art) is a software flow chart illustrating a series of conditional branches.
Figure 2:
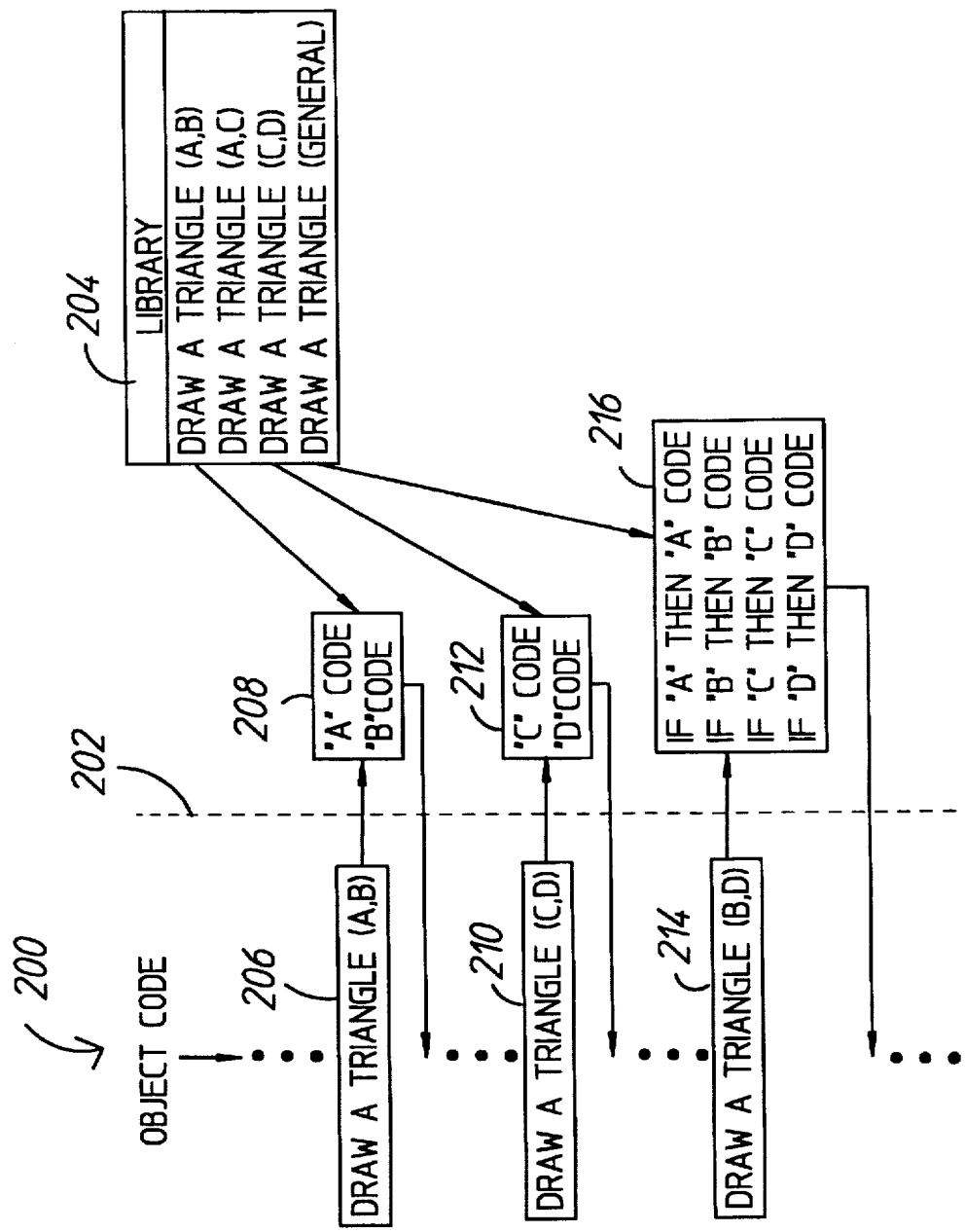
FIG. 2 (prior art) is a software flow chart illustrating use of a library of predefined procedures to provide streamlined code for some combinations of features.
Figure 3:
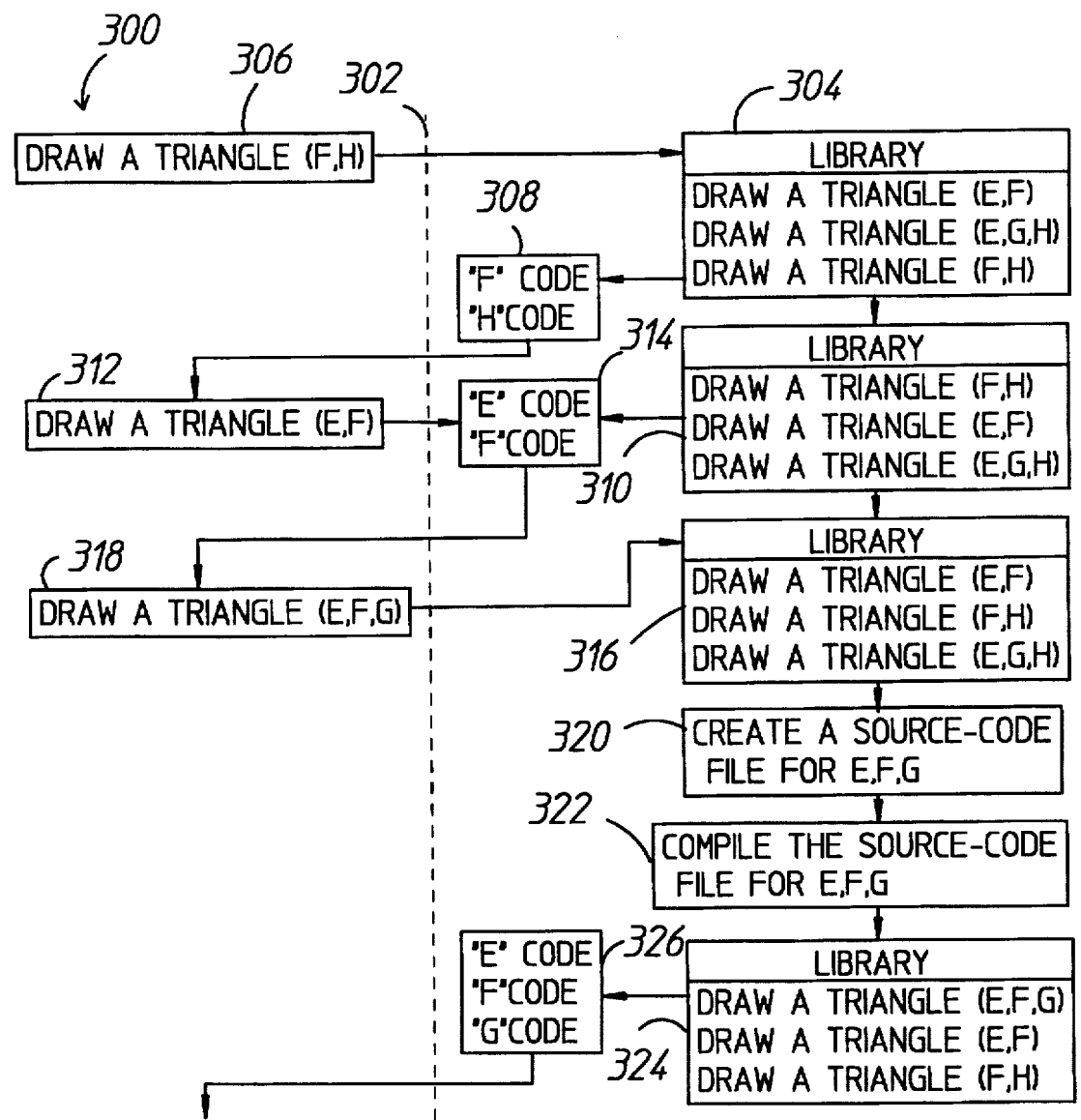
FIG. 3 is a software flow chart illustrating a library in accordance with the invention in which streamlined procedures may be defined and compiled as needed.
Figure 4:
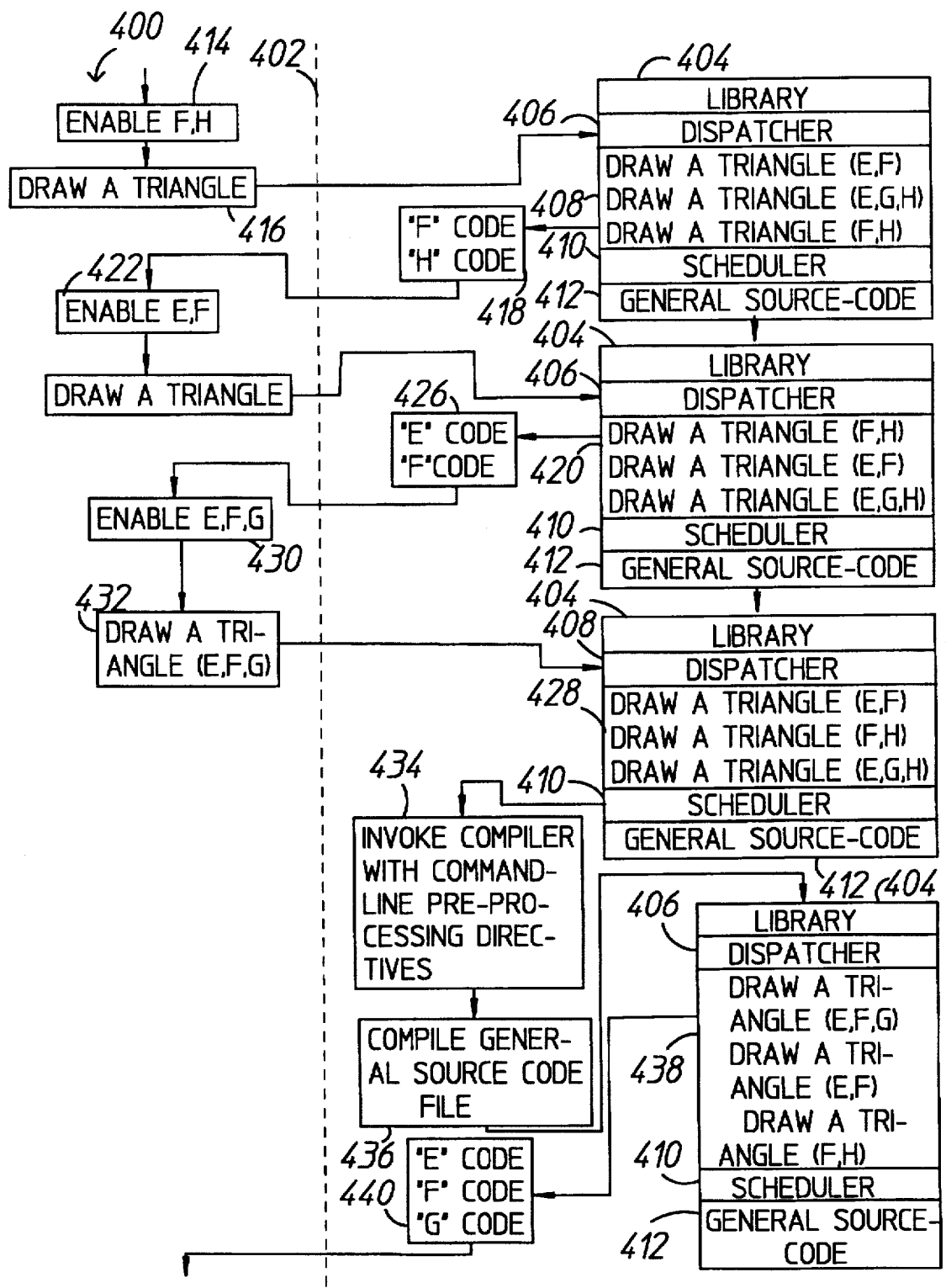
FIG. 4 is a software flow chart illustrating an alternative embodiment of a library in accordance with the invention.

FIG. 3 illustrates a graphics software applications program 300. FIG. 3 depicts procedures for drawing triangles, where each triangle may have any combination of four variables (E, F, G and H). Software to the right of the dashed line 302 is invoked by a graphics library (initially library 304 but the library is dynamically reconfigured as discussed below). In FIG. 3, variables of interest are passed from the software applications program 300 to the library 304 as part of a function or procedure call. Alternatively, as illustrated in FIG. 4, the variables of interest may be local to the library 304, or there may be a combination of defined or enabled variables and passed variables. The library 304 includes a set of optimized streamlined procedures for 3 different combinations of variables. The library 304 does not contain a general object-code procedure capable of accommodating all possible combinations of variables. The set of library procedures has a rank order. In the embodiment illustrated in FIG. 3, rank depends on how recently each procedure is used. Alternatively, rank could be determined on frequency of use.

In FIG. 3, the applications program 300 calls a procedure for drawing a triangle with variables F and H (box 306). The library 304 includes a predefined procedure for the requested combination of variables and invokes streamlined code 308 for the requested combination of variables. The streamlined code 308 does not require conditional branch instructions to determine whether variables "F" and "H" are enabled. In addition, the library 304 reranks the set of procedures to form library 310, making the procedure corresponding to the combination (F,H) the highest ranked (most recently used) procedure. The applications program 300 then calls a procedure for drawing a triangle with variables E and F (box 312). Again, the library 310 includes a predefined procedure for the requested combination and invokes streamlined code 314. Again, the library 310 reranks the set of procedures, forming library 316.

The applications program 300 then calls a procedure for drawing a triangle with variables E, F, and G. This time, the library 316 does not have a corresponding procedure. The library object code then concatenates multiple strings or string files corresponding to variables E, F and G to form a source-code file corresponding to a streamlined source-code procedure for the combination (E, F, G) (box 320). The library object code then invokes a compiler to compile the newly created source-code file (box 322). The library object code then inserts the new object-code procedure into the library 316, forming a new library 324. If the library has space, the new procedure is simply inserted. If the library has reached a capacity limit (predefined in the library code or user defined), the least recently used (or least frequently used) procedure is deleted from the library. The newly configured library 324 is then linked to the application program 300 and streamlined code 326 is invoked.

Preferably, the library reconfiguration discussed above in conjunction with FIG. 3 is transparent to application 300. That is, application 300 should interface with a fixed set of code that in turn unloads, compiles, and relinks a dynamic set of code. Some languages or compilers may allow a procedure to be appended while running, without requiring the library to be "unloaded" and "relinked". Preferably, for high performance when using large libraries, the fixed code should selectively delete and append to the dynamic code. Alternatively, the dynamic code can be completely deleted and completely recompiled. A working example of an application linked to fixed code that in turn links to dynamic code is provided in Appendices A–F, with the dynamic code completely deleted and recompiled for simplicity of illustration.

FIG. 4 illustrates an alternative embodiment. Again, there is an applications program 400, a library 404, and software to the right of the dashed line 402 is invoked by the library 404. The library 404 is comprised of 4 parts: a dispatcher 406, a set of compiled procedures 408, a scheduler 410, and a source-code file 412. The dispatcher 406, the scheduler 410 and the general source code file 412 are all fixed code. The set of compiled procedures 408 is dynamic code. The dispatcher 406 searches the set of compiled procedures 408 for a procedure corresponding to enabled variables. The set of procedures 408 is initially configured with 3 predefined, specialized, streamlined, object-code procedures as illustrated. The scheduler 410 creates a new set of procedures 408 if the dispatcher fails to find a match. The library 404 does not contain a general object-code procedure capable of accommodating all possible combinations of variables. However, the source-code file 412 includes source-code corresponding to each individual variable. Preferably, the set of procedures 408 has a rank order. In the embodiment illustrated in figure 4, rank depends on how recently each procedure is used. Alternatively, rank could be determined by frequency of use.

Program 400 first enables variables F and H (box 414). In the embodiment of FIG. 4, enabling variables E, F, G, and H is handled by library procedures and the variables are local to the library code. Program 400 then calls a procedure for drawing a triangle (box 416). The graphics library dispatcher 406 finds a predefined streamlined procedure for drawing a triangle with variables (F,H) and invokes that procedure. The streamlined procedure does not require conditional branch instructions to determine whether variables "F" and "H" are enabled (box 418). The library 404 reranks the set of procedures 408 so that the procedure for variables (F,H) goes to the top of the rank ordered list (box 420).

Program 400 then enables variables E and F (box 422) and calls a procedure for drawing a triangle (box 424). The library dispatcher 406 finds a predefined procedure for drawing a triangle with variables (E,F) and invokes the streamlined code (box 426). The library again changes the rank order of procedures, making the procedure for variables (E,F) the most recently used, as depicted in box 428.

Next, program 400 enables variables E, F and G (box 430) and calls a procedure for drawing a triangle (box 432). The dispatcher 406 searches the set of predefined procedures 428 and fails to find a corresponding procedure. In the embodiment illustrated in FIG. 4, the general source-code file 412 includes conditional compilation directives. In particular, portions of the source-code are compiled only if corresponding variables are enabled. The library scheduler 410 unloads the set of procedures 428 and invokes a compiler to compile the general source-code file 412, enabling variables (E,F,G) through the use of command line pre-processor directives (box 434). The compiler compiles the general source-code file 412 and compiles only the portions satisfying conditional compile directives within the source code file 412 (box 436). As a result of the conditional compilation directives within the general source-code file 412, the compiler generates a new streamlined object-code procedure for variables (E,F,G). If there is room in the set of procedures, the library scheduler adds or appends the new procedure to the set of procedures. If the set of procedures has reached a capacity limit (predefined in the library code or user defined), the library scheduler 410 then removes the least recently used procedure (variables E,G,H) from the set of procedures 428 and adds the newly compiled procedure to the set of procedures as the most recently used procedure, forming a set of procedures 438. Finally, the scheduler 410 links the new set of procedures 438 and the dispatcher 406 then invokes the new streamlined procedure (box 440).

When the library scheduler 410 invokes the compiler, the scheduler must define the name of the new procedure and the name of the corresponding object code file. In a specific implementation, various graphics attributes (variables) are represented by individual bits within integers. Each bit representing an attribute also has a corresponding string that is an abbreviated name of the attribute. For every bit enabled in the integers, the scheduler appends the corresponding abbreviated name to a root procedure name and to a root file name. For example, let the root procedure name and the root file name be "drawTriangle". Assume an attribute bit is enabled with a corresponding name of "Lighting". The scheduler appends the abbreviation so that the procedure name and the file name each become "drawTriangleLighting". When all the attribute bits have been exhausted, the scheduler defines the file name as an object code file. In addition, for each attribute bit that is enabled, the scheduler builds a string defining a command line preprocessor directive. For example, if the attribute "Lighting" is enabled, the scheduler appends the following text to a string:

-D Lighting—enabled

The command in the scheduler to call the compiler then has the following general form:

cc -c "string" source.c -o "filename".o where "string" is a series of statements such as "-D Lighting—enabled", "source.c" is the source-code file, and "-o "filename".o" defines the object code file (for example, drawTriangleLighting.o).

Each string becomes part of the command line to invoke the compiler. For every attribute bit, the source code file includes a sequence of conditional compile statements such as the following:

```
#ifdef Lighting_enabled
    /* source code for Lighting attribute */
```

To summarize, if the attribute bit corresponding to Lighting is enabled, the scheduler includes a string defining "Lighting—enabled" which is passed to the compiler, causing the compiler to selectively compile the source code corresponding to the "Lighting" attribute. The particular code illustrated is language and compiler specific ("C" programming language) but other languages and compilers provide similar functionality.

The processes illustrated in FIGS. 3 and 4 are transparent to the developer of the source-code for the graphics application (programs 300 and 400). The processes illustrated in FIGS. 3 and 4 do not require any changes to the compiler. All the necessary features are implemented in the library code. For the embodiment of FIG. 4, many compilers, and in particular C compilers, include a feature called a preprocessor. See, for example, Brian W. Kernighan and Dennis M. Ritchie, *The C Programming Language*, second edition, 1988. One of the features of the preprocessor is conditional statements that are evaluated during precompilation, providing a way to include code selectively, depending on the value of conditions evaluated during precompilation. This is typically used to ensure that certain files are only included once, enabling the compiler to skip inclusion of a file if the file is already included. In the embodiment illustrated in FIG. 4, preprocessor conditional compilation directives are used to select only the appropriate portions of the source-code file required to generate a streamlined procedure for a particular combination of attributes.

Figure 5:
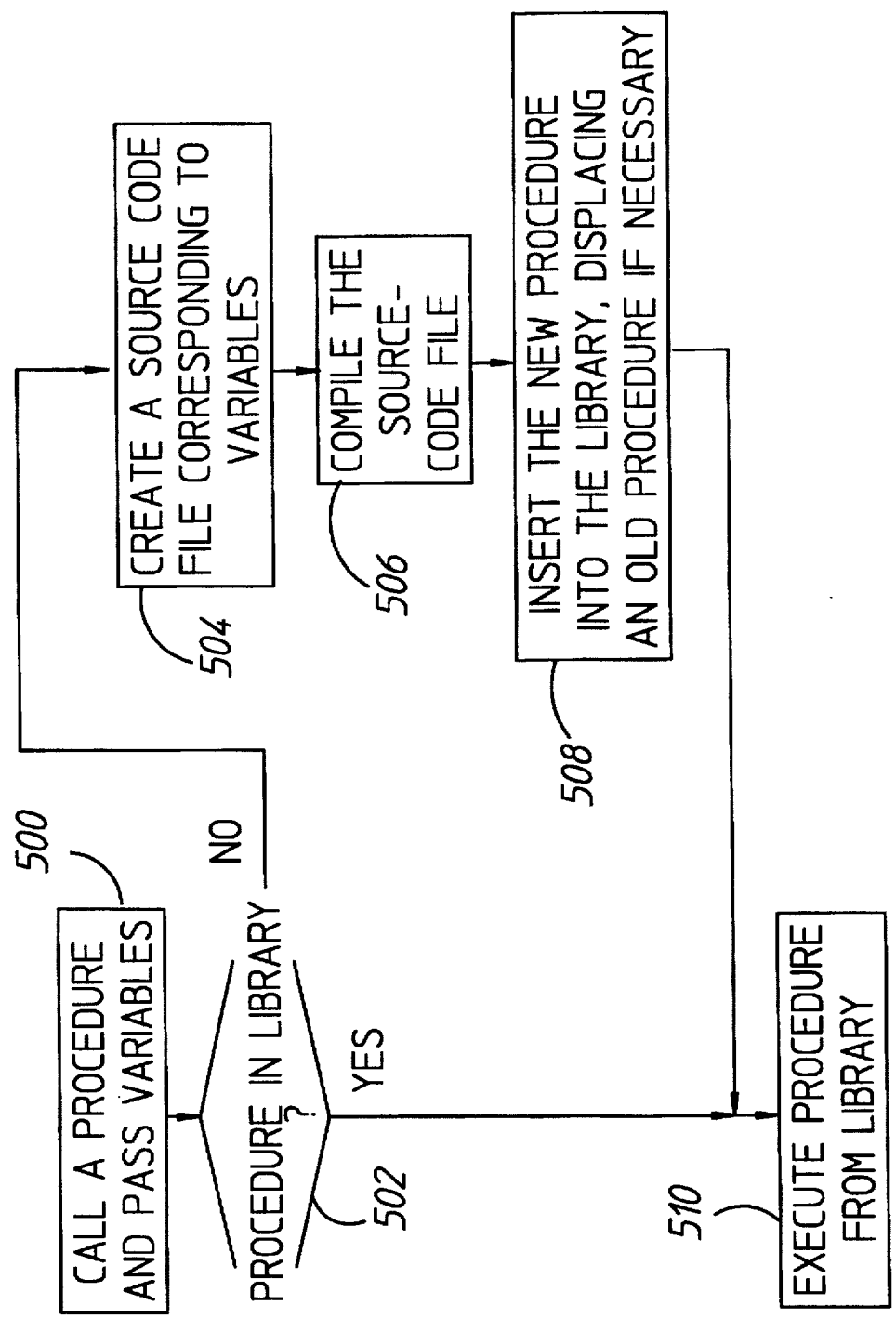
FIG. 5 is a flow chart illustrating one embodiment of a process in accordance with the invention.

FIG. 5 illustrates the general process of FIG. 3. In FIG. 5 as in FIG. 3, variables are passed from the application to the library. Again, in general, variables may be defined or enabled earlier, the variables may be passed, or the variables may be a mixture of defined and passed. In FIG. 5, an applications program calls a procedure (box 500) and passes variables to a library. The library tests to see if the procedure is predefined (test 502). If the procedure is not predefined, the library generates a source code file (box 504) corresponding to the set of passed variables, and compiles the source code file (box 506). The newly compiled procedure is inserted into the library (box 508), displacing an older library procedure if necessary. The library then invokes the requested procedure (box 510).

Figure 6:
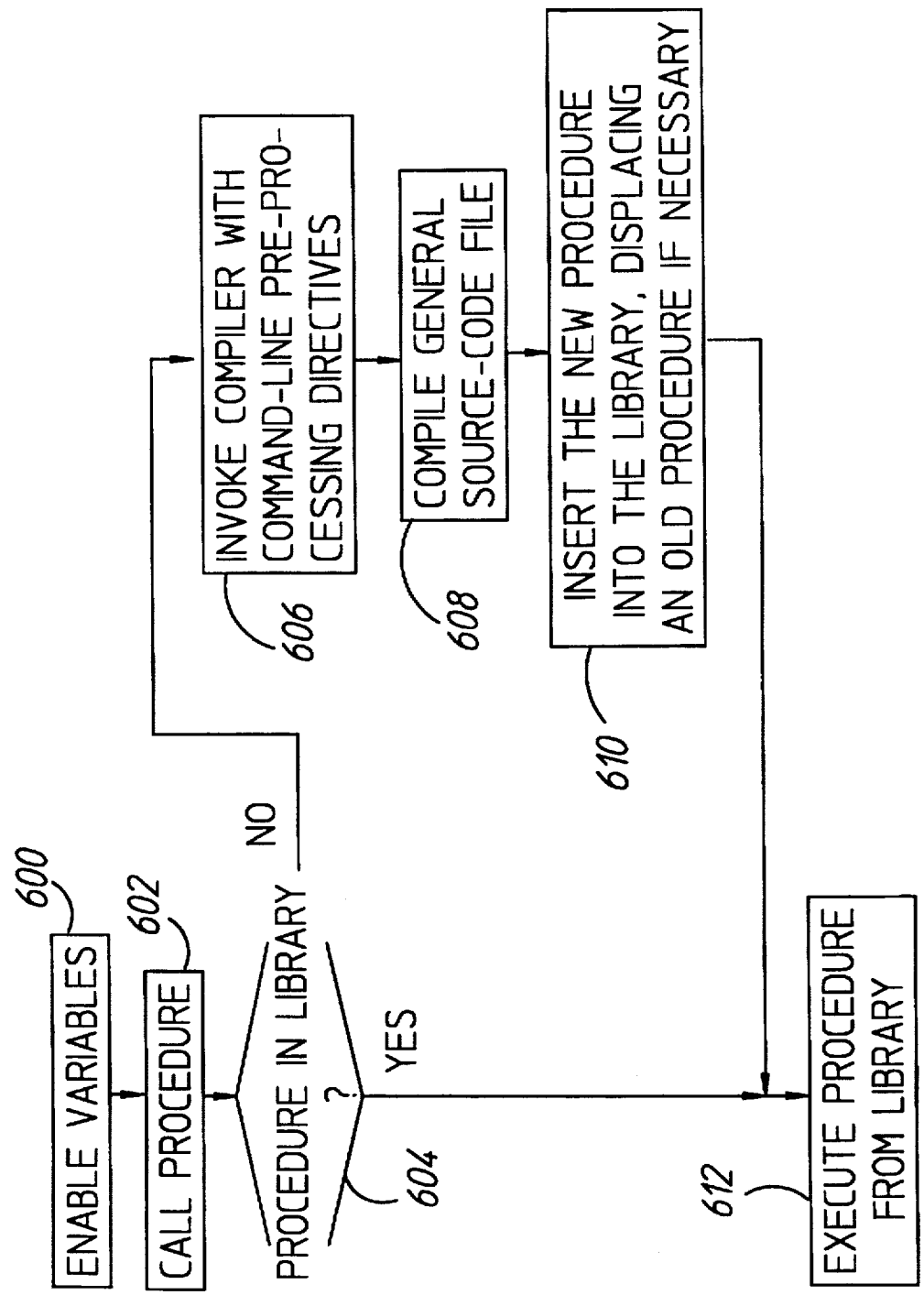
FIG. 6 is a flow chart of an alternative process in accordance with the invention.

FIG. 6 illustrates the general process of FIG. 4. In FIG. 6, as in FIG. 4, variables are local to the library and enabled before the application program calls a procedure. Again, in general, variables may be defined or enabled earlier, passed, or the variables may be a mixture of defined and passed. In FIG. 6, an applications program enables variables (box 600) and then calls a procedure (box 602). A library tests to see if a procedure corresponding to the enabled variables is predefined (test 604). If the procedure is not predefined, the library invokes a compiler with command-line preprocessing directives (box 606) that in conjunction with conditional compile statements in a source code file cause the compiler to selectively compile portions of the source code file (box 608). The newly compiled procedure is inserted into the library (box 610), displacing an older library procedure if necessary. The library then invokes the requested procedure (box 612).

When variables are local to the library, once variables are defined, the library does not have to wait until a procedure is called to reconfigure the set of defined procedures. That is, as the applications software is running, as soon as a combination of variables is defined that is different than the combinations already compiled, the library could anticipate that procedures will be needed and immediately compile appropriate procedures.

In FIGS. 3–6, a library is "unloaded", recompiled, and "relinked". As discussed in conjunction with FIG. 3, some languages or compilers may allow a procedure to be appended while running, without requiring the library to be "unloaded" and "relinked".

Appendices A–F are modules of a working example program for a virtual code system as illustrated in FIGS. 4 and 6. The software in appendices A–F is written in the "C" programming language for the Microsoft Windows operating system for personal computers. Appendix A is an applications program, as in FIG. 4, 400. Appendix F is the output produced when the program of Appendix A is executed in conjunction with the library modules of Appendices B–E. Appendix B is a generalized source code module for drawing a triangle with any combination of variables, as in FIG. 4, 412. Appendix C is a header file containing definitions used by the generalized triangle code of Appendix B. Appendix D is a library, in accordance with the invention, that provides streamlined code if available, invokes a compiler to recompile the generalized source code of Appendix B if streamlined code is not available, and adds or replaces streamlined code when necessary. Appendix E is a header file containing definitions and function prototypes used by the library code of Appendix D.

The applications program (Appendix A) requests a total of eight triangles. The library (Appendix D) is initially empty and has a capacity for three streamlined routines. Routines for the first three triangles (variables (E,F), (E,G,H), and (F,H)) are added to the library when requested by the applications program. For the fourth triangle requested by the applications program (variables E,F), a streamlined routine is already available in the library. For simplicity of illustration, the library of Appendix D does not replace the least recently used routine, and instead replaces the oldest routine (first-in, first-out). Therefore, for the fifth triangle (variables E,F,G), the library displaces code for variables (E,F) with new code for variables (E,F,G). Next, the library displaces code for variables (E,G,H) (now the oldest) for new code for variables (E,H). Finally, the application requests two triangles with variables (E,F), for which streamlined code is already available in the library.

The compiler, a linker for the compiler, the library (Appendix D), and the streamlined routines provided by the library all produce printed output when invoked. In particular, the compiler and the linker each print an identification line stating the name of the company, the name of the software, and the version number, along with a copyright notice. These identification lines and copyright notices have been replaced in Appendix F with the words in italics between square brackets.

In FIG. 4, the dispatcher 406, compiled procedures 408, and scheduler 410 are all depicted as being part of a single "library" 404. In FIG. 4, the scheduler 410 loads and unloads just the compiled procedures 408. The library software of Appendices D and E is a proof-of-concept demonstration that provides the same benefit, still transparent to the application program, but in a slightly different way. In the software in the appendices, instead of a fixed code scheduler and a dynamic set of compiled procedures, there are two libraries, one fixed and one dynamic. The application sees only a first library: "library.dll". Library.dll calls a second library "drawTriangle.dll". When the applications software requests a triangle that requires new undefined streamlined code, library.dll deletes drawTriangle.dll, compiles a new drawTriangle.dll with conditional compilation statements as discussed in conjunction with FIG. 4, and then links the newly compiled code with existing object modules.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

- 18 -

APPENDIX A

```
       /*
        * application.cpp:
  5     *
        * PURPOSE
        *     Simulate an application using the Virtual Code System.
        */
       #include <stdlib.h>
 10    #include <stdio.h>
       #include <math.h>
       #include "library.h"

void main()
 15    {
               initializeLibrary();

/* Draw a triangle(E,F). */
               enableE();
 20            enableF();
               drawTriangle();

/* Draw a triangle(E,G,H). */
               disableF();
 25            enableG();
               enableH();
               drawTriangle();

/* Draw a triangle(F,H). */
 30            disableE();
               disableG();
               enableF();
               drawTriangle();

35            /* Draw a triangle(E,F). */
               disableH();
               enableE();
               drawTriangle();

40            /* Draw a triangle(E,F,G). */
               enableG();
               drawTriangle();
```

```
        /* Draw a triangle(E,F). */
        disableG();
        drawTriangle();
        drawTriangle();
5       drawTriangle();
    }→
```

- 20 -

APPENDIX B

```
/*
 * drawTriangle.c:
 *
 * PURPOSE
 *     This module contains the code for drawing a triangle.
 *
 * PARAMETERS
 *     FUNCTION_NAME The name of the target function to be created during
 *         compilation of this module.
 *     E_DEFINED
 *     F_DEFINED
 *     G_DEFINED
 *     H_DEFINED
 *
 * NOTES
 *     This module uses a technique called shunting. The conditional compilation
 *     of code is enabled by declaring static BOOLEAN variables that are
 *     initialized based on preprocessor directives that are specified as parameters
 *     to the compiler. The optimizing compiler should remove the dead code if
 *     a BOOLEAN variable is initialized to FALSE.
 */
#include <stdlib.h>
#include <stdio.h>
#include <math.h>
#include <windows.h>
#include "drawTriangle.h"

#ifdef E_DEFINED
static BOOLEAN isE = TRUE;
#else
static BOOLEAN isE = FALSE;
endif ifdef F_DEFINED
static BOOLEAN isF = TRUE;
#else
static BOOLEAN isF = FALSE;
endif ifdef G_DEFINED
```

- 21 -

```
                static BOOLEAN isG = TRUE;
                #else
                static BOOLEAN isG = FALSE;
                #endif ifdef H_DEFINED
                static BOOLEAN isH = TRUE;
                #else
                static BOOLEAN isH = FALSE;
                #endif /*
                 * void drawTriangle()
                 *
                 * PURPOSE
                 *     Draws a triangle.
                 *
                 * PARAMETERS
                 *     None.
                 */
                DLL void FUNCTION_NAME()
                {
                        if (isE)
                        {
                                /* Case E code goes here. */
                                fprintf (stdout, "%s, %d: Executing E Code.\n", __FILE__,
                __LINE__);
                        } if (isF)
                        {
                                /* Case F code goes here. */
                                fprintf (stdout, "%s, %d: Executing F Code.\n", __FILE__,
                __LINE__);
                        } if (isG)
                        {
                                /* Case G code goes here. */
                                fprintf (stdout, "%s, %d: Executing G Code.\n", __FILE__,
                __LINE__);
```

- 22 -

```
                } if (isH)
5               {
                    /* Case H code goes here. */
                    fprintf (stdout, "%s, %d: Executing H Code.\n", __FILE__,
        __LINE__);
                }
10          }-
```

- 23 -

APPENDIX C

```
/*
 * drawTriangle.h:
 */
#define EXPORT __declspec(dllexport)
#define IMPORT __declspec(dllimport)

#ifdef _LIBRARY
#define DLL EXPORT
#else
#define DLL IMPORT
endif

DLL void FUNCTION_NAME();
```

- 24 -

APPENDIX D

```
/*
 * library.c: The library code that implements the Virtual Code System.
 */
#include <stdlib.h>
#include <stdio.h>
#include <math.h>
#include <string.h>
#include <windows.h>
#include "library.h"

/*
 * Defines.
 */
#define SUCCESS 0
#define FAILURE -1
#define MAX_DEPTH_STACK 3
#define IS_E_BIT (1 << 0)
#define IS_F_BIT (1 << 1)
#define IS_G_BIT (1 << 2)
#define IS_H_BIT (1 << 3)

typedef struct {
        UINT variables;
        FARPROC f;
        char functionName[80];
} tFrame;

typedef struct {
        INT currentDepth;
        tFrame frames[MAX_DEPTH_STACK];
} tStack;

/*
 * Static variables.
 */
static UINT currentVariables = 0x0000;
static tStack stack;
static HANDLE hLibrary;

/*
```

```
         * enableE:
         */
        DLL void enableE()
        {
5               currentVariables |= IS_E_BIT;
        }

/*
         * disableE:
10       */
        DLL void disableE()
        {
                currentVariables &= ~IS_E_BIT;
        }
15
        /*
         * enableF:
         */
        DLL void enableF()
20      {
                currentVariables |= IS_F_BIT;
        }

/*
25       * disableF:
         */
        DLL void disableF()
        {
                currentVariables &= ~IS_F_BIT;
30      }

/*
         * enableG:
         */
35      DLL void enableG()
        {
                currentVariables |= IS_G_BIT;
        }

40      /*
         * disableG:
         */
```

- 26 -

```
    DLL void disableG()
    {
            currentVariables &= ~IS_G_BIT;
    }
5
    /*
     * enableH:
     */
    DLL void enableH()
10  {
            currentVariables |= IS_H_BIT;
    }

/*
15   * disableH:
     */
    DLL void disableH()
    {
            currentVariables &= ~IS_H_BIT;
20  }

/*
     * initializeLibrary:
     */
25  DLL void initializeLibrary()
    {
            /* Erase all drawTriangle object modules. */
            system("erase drawTriangle*.obj");

30          stack.currentDepth = 0;
    }

/*
     * drawTriangle:
35   */
    void drawTriangle()
    {
            INT i;
            char functionName[160];
40          char compilerDirectives[160];
            char systemCommand[160];
            char objectModuleName[160];
```

- 27 -

```
       /*
        * Search for function in stack.
        */
       for (i = 0; i < stack.currentDepth; i++)
 5     {
               /* If function is in library all ready then. */
               if (stack.frames[i].variables == currentVariables)
               {
                       fprintf(stdout, "%s, %d: Function is in library all ready.\n",
10     __FILE__, __LINE__);
                       fprintf(stdout, "%s, %d: Execute function %s.\n", __FILE__, __LINE__,
       stack.frames[i].functionName);

/* Execute procedure from library. */
15             (*stack.frames[i].f)();

/* Return from procedure. */
               return;
               }
20     }

/*
        * Create a source code module corresponding to current variables.
        */
25     strcpy(functionName, "drawTriangle");
       strcpy(compilerDirectives, "cl /c");

if (currentVariables & IS_E_BIT)
       {
30             strcat(functionName, "E");
               strcat(compilerDirectives, " /D E_DEFINED");
       } if (currentVariables & IS_F_BIT)
35     {
               strcat(functionName, "F");
               strcat(compilerDirectives, " /D F_DEFINED");
       }

40     if (currentVariables & IS_G_BIT)
       {
               strcat(functionName, "G");
```

- 28 -

```
            strcat(compilerDirectives, " /D G_DEFINED");
        } if (currentVariables & IS_H_BIT)
        {
            strcat(functionName, "H");
            strcat(compilerDirectives, " /D H_DEFINED");
        } strcat(compilerDirectives, " /D _LIBRARY");

strcat(compilerDirectives, " /D FUNCTION_NAME=");
        strcat(compilerDirectives, functionName);

/*
         * Compile the source-code file.
         */
        strcpy(systemCommand, compilerDirectives);
        strcat(systemCommand, " drawTriangle.c");
        system(systemCommand);

/*
         * Rename the object module.
         */
        strcpy(objectModuleName, functionName);
        strcat(objectModuleName, ".obj");
        strcpy(systemCommand, "rename ");
        strcat(systemCommand, "drawTriangle.obj ");
        strcat(systemCommand, objectModuleName);
        system(systemCommand);

/*
         * Unload the library.
         */
        FreeLibrary(hLibrary);

/*
         * If the currentDepth of the stack is at its maximum then remove the last
         * function in the stack.
         * and in addition remove the object module so it is not linked into the    *
  library.
         */
```

- 29 -

```
        if (stack.currentDepth == MAX_DEPTH_STACK)
        {
                fprintf(stdout, "%s, %d: Removing object module %s.obj.\n",
        __FILE__, __LINE__, stack.frames[MAX_DEPTH_STACK - 1].functionName);

/* Remove object code module. */
                strcpy(systemCommand, "erase ");
                strcat(systemCommand, stack.frames[MAX_DEPTH_STACK -
        1].functionName);
                strcat(systemCommand, ".obj");
                system(systemCommand);
        } else
                stack.currentDepth++;

/*
         * Re-link the library.
         */
        system("link drawTriangle*.obj /dll /OUT:drawTriangle.dll");

/*
         * Load the library.
         */
        hLibrary = LoadLibrary("drawTriangle");

/*
         * Insert the new procedure into the library replacing an old procedure if
         * necessary.
         */
        /*
         * Shift stack.
         */
        for (i = (MAX_DEPTH_STACK - 1); i > 0; i--)
        {
                stack.frames[i] = stack.frames[i - 1];
        }

/*
         * Add new frame to stack.
         */
        stack.frames[0].variables = currentVariables;
```

- 30 -

```
        strcpy(stack.frames[0].functionName, functionName);

/*
         * Resolve all drawTriangle* functions currently in the stack.
         */
        for (i = 0; i < stack.currentDepth; i++)
        {
                if ((stack.frames[i].f = GetProcAddress(hLibrary,
        stack.frames[i].functionName)) == NULL)
                {
                        fprintf (stdout, "%s, %d: get failed.\n", __FILE__,
        __LINE__);
                        return;
                }
        }

/*
         * Execute the new function.
         */
        fprintf(stdout, "%s, %d: Execute function %s.\n", __FILE__, __LINE__,
        stack.frames[0].functionName);
        (*stack.frames[0].f)();
        return;
}
```

APPENDIX E

```
 /*
  * library.h:
  */
#define EXPORT __declspec(dllexport)
#define IMPORT __declspec(dllimport)

#ifdef _LIBRARY
#define DLL EXPORT
#else
#define DLL IMPORT
endif ifdef __cplusplus
extern "C" {
#endif

DLL void enableE();
DLL void disableE();
DLL void enableF();
DLL void disableF();
DLL void enableG();
DLL void disableG();
DLL void enableH();
DLL void disableH();
DLL void initializeLibrary();
DLL void drawTriangle();

#ifdef __cplusplus
}
#endif
```

- 32 -

APPENDIX F

```
D:\hochmuth\patent\patent > patent
```
*[compiler identification statement and copyright notice]* drawTriangle.c
*[linker identification statement and copyright notice]*

```
Creating library drawTriangle.lib and object drawTriangle.exp
library.c, 262: Execute function drawTriangleEF.
drawTriangle.c, 64: Executing E Code.
drawTriangle.c, 70: Executing F Code.
```
*[compiler identification statement and copyright notice]* drawTriangle.c
*[linker identification statement and copyright notice]*

```
Creating library drawTriangle.lib and object drawTriangle.exp
library.c, 262: Execute function drawTriangleEGH.
drawTriangle.c, 64: Executing E Code.
drawTriangle.c, 77: Executing G Code.
drawTriangle.c, 84: Executing H Code.
```
*[compiler identification statement and copyright notice]* drawTriangle.c
*[linker identification statement and copyright notice]*

```
Creating library drawTriangle.lib and object drawTriangle.exp
library.c, 262: Execute function drawTriangleFH.
drawTriangle.c, 70: Executing F Code.
drawTriangle.c, 84: Executing H Code.
library.c, 134: Function is in library all ready.
library.c, 135: Execute function drawTriangleEF.
drawTriangle.c, 64: Executing E Code.
drawTriangle.c, 70: Executing F Code.
```
*[compiler identification statement and copyright notice]*

```
drawTriangle.c
library.c, 208: Removing object module drawTriangleEF.obj.
```
*[linker identification statement and copyright notice]*

```
Creating library drawTriangle.lib and object drawTriangle.exp
```

```
                library.c, 262: Execute function drawTriangleEFG.
                drawTriangle.c, 64: Executing E Code.
                drawTriangle.c, 70: Executing F Code.
                drawTriangle.c, 77: Executing G Code.
 5              [compiler identification statement and copyright notice]

drawTriangle.c
                library.c, 208: Removing object module drawTriangleEGH.obj.
                [linker identification statement and copyright notice]
10
                   Creating library drawTriangle.lib and object drawTriangle.exp
                library.c, 262: Execute function drawTriangleEF.
                drawTriangle.c, 64: Executing E Code.
                drawTriangle.c, 70: Executing F Code.
15              library.c, 134: Function is in library all ready.
                library.c, 135: Execute function drawTriangleEF.
                drawTriangle.c, 64: Executing E Code.
                drawTriangle.c, 70: Executing F Code.
                library.c, 134: Function is in library all ready.
20              library.c, 135: Execute function drawTriangleEF.
                drawTriangle.c, 64: Executing E Code.
                drawTriangle.c, 70: Executing F Code.
```

What is claimed is:

1. A process, in computer, for creating a procedure while a program is running, comprising the following steps:

(a) requesting, by the program, a procedure from a library;

(b) determining, by the library, a set of predefined variables corresponding to the procedure;

(c) building, as needed, and providing, by the library, a source code file corresponding to the set of predefined variables;

(d) invoking, by the library, a compiler to compile the source code file;

(e) compiling, by the compiler, the source code file, resulting in a new procedure;

(f) inserting and reranking the new procedure into the library; and (g) invoking, by the library, the new procedure.

2. The process of claim 1, step (b) further comprising:

passing the set of predefined variables from the program to the library.

3. The process of claim 1, step (b) further comprising;

reading the set of predefined variables as variables that are local to the library.

4. The process of claim 1, step (c) further comprising:

writing, by the library, a source code file corresponding to the set of predefined variables.

5. The process of claim 1:

step (c) further comprising; the library including a source code file, the source code file including source code corresponding to each variable in the set of predefined variables;

step (d) further comprising invoking the compiler to compile the source code file; and step (e) further comprising selectively compiling only portions of the source code file corresponding to the set of predefined variables.

6. The process of claim 1, wherein reranking of steps (f) further comprising the following step:

(h) replacing a least recently used procedure from the library with the new procedure.

7. The process of claim 1, wherein reranking of step (f) further comprising the following step:

(h) replacing a least frequently used procedure from the library with the new procedure.

* * * * *